United States Patent [19]

Murase

[11] 3,931,464
[45] Jan. 6, 1976

[54] LINE SKIP SYSTEM FOR FACSIMILE DEVICE

[75] Inventor: Katsuo Murase, Tokyo, Japan

[73] Assignee: Ricoh Co., Ltd., Tokyo, Japan

[22] Filed: Oct. 10, 1974

[21] Appl. No.: 513,687

[30] Foreign Application Priority Data
Nov. 1, 1973  Japan.............................. 48-123090

[52] U.S. Cl. ................. 178/7.1; 178/6; 178/DIG. 3
[51] Int. Cl.² ........................................... H04N 1/38
[58] Field of Search................. 178/7.1, DIG. 3, 6; 250/232; 340/146.3 H

[56] References Cited
UNITED STATES PATENTS

| | | | |
|---|---|---|---|
| 3,621,130 | 11/1971 | Habbal.............................. | 178/6.8 X |
| 3,646,257 | 2/1972 | Epstein et al.................. | 178/DIG. 3 |
| 3,670,099 | 6/1972 | Oliver........................... | 178/DIG. 3 |
| 3,730,988 | 5/1973 | Shimizy......................... | 178/DIG. 3 |

Primary Examiner—Albert J. Mayer
Assistant Examiner—Mitchell Saffian
Attorney, Agent, or Firm—Frank J. Jordan

[57] ABSTRACT

A document for transmission has ruled lines such as borders printed at predetermined locations thereon which do not constitute usable information. The main scan direction is perpendicular to the ruled lines. Each main scan line is pre-scanned to determine if the line contains information other than the ruled lines, and the main scan line is scanned again for transmission if information is encountered and skipped if information is not encountered. A gating signal is generated in synchronism with the pre-scanning step, but the gating signal is suppressed while the portions of the main scan line intersecting the ruled lines are being pre-scanned. If the gating signal and electrical signals resulting from pre-scanning usable information contained in the main scan line are sensed simultaneously, the line is scanned for transmission.

8 Claims, 9 Drawing Figures

LINE SKIP SYSTEM FOR FACSIMILE DEVICE

The present invention relates to a main scan line skip control system for a facsimile device which is adapted to ignore the presence of ruled lines such as borders printed on the document for transmission.

Since many documents to be transmitted by a facsimile transmission device contain blank areas which do not constitute usable information, it is desirable not to transmit these areas in order to reduce the transmission time. Information indicating that blank areas have not been transmitted is transmitted instead of the areas themselves to enable synthesis of the document at the receiver. Prior art methods include bandwidth compression techniques including run length coding, variable speed scanning, etc. The latter is best suited for a facsimile system involving transmission over a telephone line, since a high compression ratio can be achieved using a relatively simple apparatus. The present invention may be advantageously used in conjunction with existing bandwidth compression systems. In such a system, a scanner scans the document in a raster pattern. The scanner comprises a pre-scan head and a transmission scan head. As the transmission scan head scans a raster line for transmission, the pre-scan head scans a preceeding line to determine if the preceeding line contains usable information. The preceeding line will be subsequently scanned for transmission by the transmission scan head if it is determined that the line contains information and skipped if it is determined that it does not contain information. Since the scanner operates by generating electrical signals corresponding to dark areas on the document, the generation of electrical signals during the pre-scan of a line indicates that the line contains information, since blank areas of the document are white and no electrical signals are generated when such blank areas are scanned. Systems embodying this method are known in the art and operate effectively while comprising a simple mechanism.

A disadvantage is encountered in these systems, however, if the document contains ruled lines such as borders or frames which are arranged perpendicular to the main scan direction. Such documents are in common use in offices as printed forms and the like, and the ruled lines do not constitute usable information. It is therefore desirable to skip any scan line which contains a portion of a ruled line but no usable information. Prior art systems of the type described above, however, will transmit such a line since an electrical signal is generated when the pre-scanning head sweeps over the ruled line.

It is therefore an important object of the present invention to provide a method of determining whether a scan line in facsimile transmission intersecting a ruled line of a document for transmission contains usable information while ignoring the presence of the ruled line.

It is another important object of the present invention to provide a system embodying the above method.

It is a further important object of the present invention to provide a skip control system for a facsimile transmission device embodying the above method.

The above and other objects, features and advantages of the present invention will become clear from the following detailed description taken in conjunction with the accompanying drawings, in which.

Figure 1:
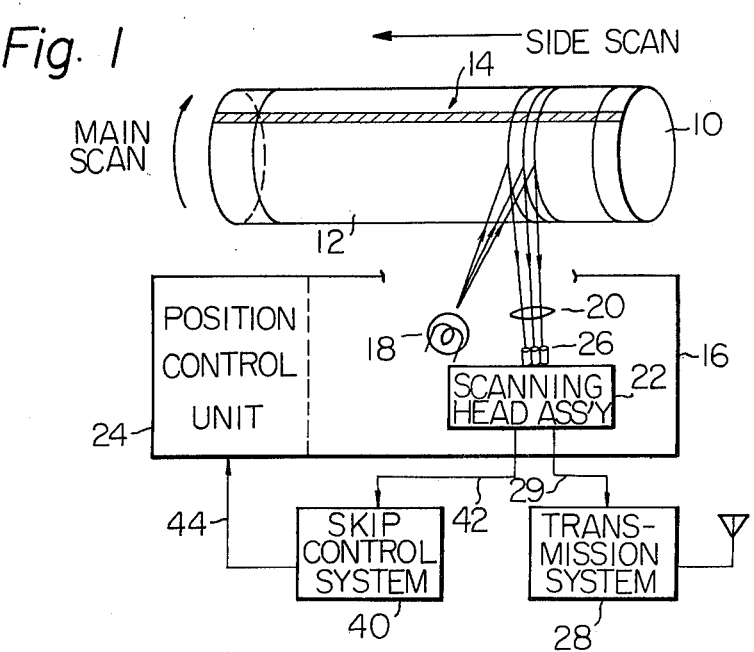
FIG. 1 is a schematic diagram of a facsimile system incorporating the present invention.

Referring now to FIG. 1, a facsimile transmission device to which the present invention is applicable includes a scanning drum 10 on which is fixed an original document 12 for transmission. The drum 10 rotates in the direction indicated by an arrow as the main scan direction. A dark colored synchronizer bar 14 is fixed to the surface of the drum 10 parallel to the axis thereof as will be described below.

A scanner 16 comprises a light source 18, an optical system 20, a scanning head assembly 22 and a position control unit 24. During normal scanning, a spot of light is focussed on the surface of the document 12 as the drum 10 rotates by the light source 18. An image of the portion of the document 12 illuminated by the spot of light is focussed onto scan heads 26 by the optical system 20, which generate electrical signals if the portion is dark and do not generate electrical signals if the portion is light. As mentioned above, the electrical signals represent the usable information printed on the document 12, and the electrical signals are fed to a transmission system 28 through a line 29 to be suitably processed and transmitted to a receiver (not shown) which synthesizes a facsimile of the document 12. The position control unit 24 of the scanner 16 moves the spot of light and also the scanning point parallel to the axis of the drum 10 in the direction indicated by an arrow as the side scan direction as the drum 10 rotates. As a result of the combined motion, the locus of the scanning point on the drum 10 is a helix. However, since the lead (in the side scan direction) is quite small in order to provide adequate resolution in the facsimile device, the locus of the scanning point can be considered as substantially a series of main scan lines of a raster pattern which are parallel to two of the sides of the document 12.

Figure 2:
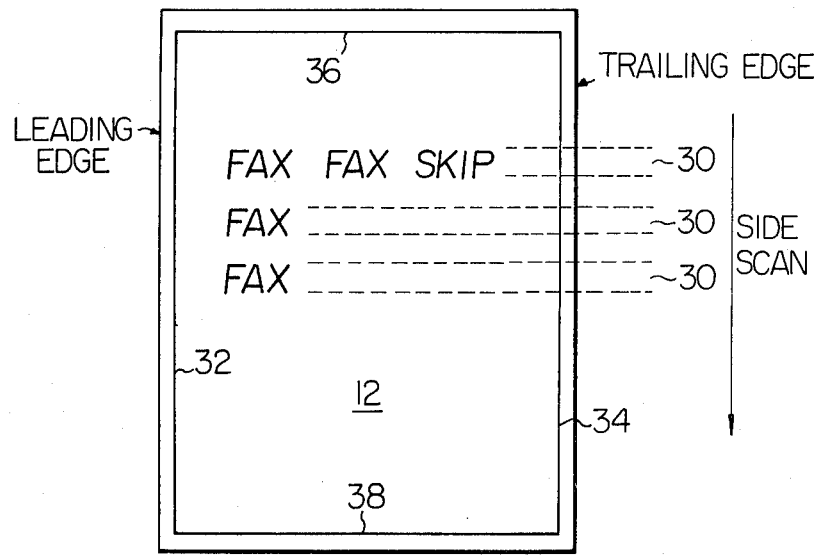
FIG. 2 is a graphic view of a document for transmission having ruled lines printed thereon.

Referring now to FIG. 2, an example of the document 12 is shown as having a white background (no numeral) on which lines 30 of characters constituting the usable information of the document 12 are printed or written. The lines 30 are shown as arranged parallel to the main scan direction indicated by an arrow, although they may be arranged perpendicular thereto if desired. Vertical ruled lines 32 and 34 are printed near leading and trailing edges of the document 12 in the main scan direction, and are parallel to and spaced from the leading and trailing edges by predetermined distances which may be equal. The document 12 is preferably of orthogonally quadrilateral form (rectangle or square) but may have any other shape as long as the ruled lines 32 and 34 are perpendicular to the main scan direction. Horizontal ruled lines 36 and 38 are also printed on the document 12 and form a closed frame or border in conjunction with the vertical ruled lines 32 and 34. The present invention is only concerned, however, with the vertical ruled lines 32 and 34 which are perpendicular to the main scan direction.

It will be noticed that there are blank areas of the document 12 above and below the lines 30 and also between the lines 30. In order to reduce the transmission time as mentioned above, it is desirable to skip, or not transmit these blank areas. Referring again to FIG. 1, the scanning heads 26 include pre-scan heads and a transmission scan head (not designated). The transmission scan head scans along a main scan line or path on the document 12 for transmission and feeds the electrical signals to the transmission system 28 as described above. The pre-scan heads are arranged to simultaneously scan a main scan line preceeding the main scan line being scanned by the transmission scan head to determine if the preceeding line contains usable information. If the line scanned by the pre-scan heads is determined to contain information, as indicated by the generation of electrical signals representing dark areas on the document 12 by the pre-scan heads, the line will be subsequently scanned by the transmission scan head for transmission. If the line does not contain information, it will be skipped (not scanned by the transmission scan head).

The output of the pre-scan heads is fed to a skip control system 40 through a line 42. The skip control system 40 senses for the presence of usable information, and feeds a signal to the position control unit 24 through a line 44 to control the unit 24 to scan a line for transmission or skip the line. A prior art control system will, however, only skip the blank areas above and below the lines 36 and 38 respectively since the lines 32 and 34 will be evaluated as usable information. In this disclosure, a ruled line is considered to mean a line which is printed on a document 12 to aid in the alignment of handwriting, etc., and does not infer the necessity of using a ruler in drawing the lines. Ruled lines to be ignored during pre-scanning according to the present invention may horizontal lines to aid in horizontal writing, vertical lines to aid in vertical alignment of columns or vertical writing or frames or borders as shown which are perpendicular to the main scan direction.

The principle of the present invention is to generate a gating signal in synchronism with the pre-scanning of a main scan line. Generation of the gating signal is suppressed, however, during the time when the pre-scanning heads are scanning a portion of the scan line which intersects a ruled line. It is essential that the ruled lines be in predetermined positions on the document 12, as is the case with many office forms. The line being pre-scanned is determined to contain information if the gating signal and an electrical signal generated by the pre-scanning heads in response to encountering information are sensed simultaneously.

Figure 3:
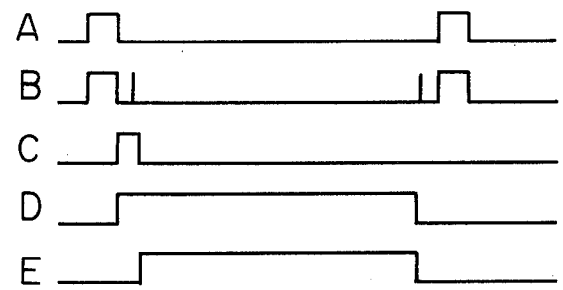
FIG. 3 is a timing chart illustrating the operation of the system of FIG. 1.

FIG. 3 illustrates the principle of the present invention. FIG. 3a shows synchronizing pulses resulting from pre-scanning the synchronizer bar 14 occuring at the beginning and end of pre-scanning a main scan line or path. FIG. 3b is similar to FIG. 3a but further shows electrical signals or pulses resulting from pre-scanning the ruled lines 32 and 34. FIG. 3c illustrates a set pulse for a bistable element (which will be described in detail below) generated in response to the downclock or trailing edge of the first synchronizing pulse, and FIG. 3d illustrates a reset pulse for the bistable element which is also generated in response to the downclock of the first synchronizing pulse.

FIG. 3e illustrates a gating signal or pulse generated by the bistable element in response to the set and reset pulses. The gating pulse is generated between the downclocks of the set and reset pulses. The set and reset pulses are arranged so that the downclock of the set pulse occurs after the pre-scanning heads have swept past the line 32 and the downclock of the reset pulse occurs before the pre-scan heads sweep up to or reach the line 34. The gating signal shown in FIG. 3e is thereby present only in the interval between and not including the pre-scanning of the lines 32 and 34. Since both the gating signal and an electrical signal representing information in the line being scanned must be simultaneously present if the electrical signal is to be determined to represent usable information, the pulses resulting from the pre-scanning of the lines 32 and 34 will be ignored since they are not coincident with the gating signal.

Figure 4:
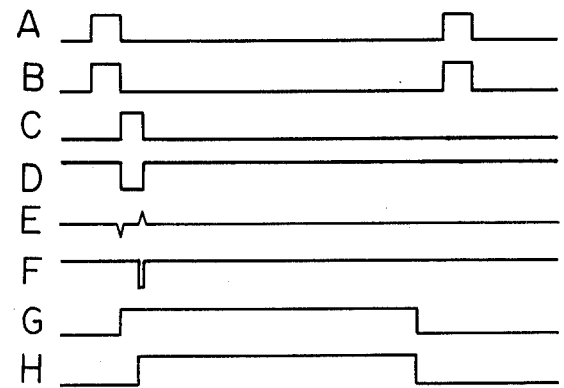
FIG. 4 is a more detailed version of the timing chart shown in FIG. 3.

This principle is illustrated in more detail in FIG. 4. FIGS. 4a, 4b, 4c, 4g and 4h are identical to FIGS. 3a to 4e respectively. FIGS. 4d and 4e show the set pulse of FIG. 4c as inverted and differentiated respectively. FIG. 4f shows a pulse generated in response to the positive spike generated in response to the downclock of the set pulse of FIG. 4c. The pulse of FIG. 4f is used to set the bistable element. Pulses similar to those shown in FIGS. 4d to 4f are generated in conjunction with the reset pulse of FIG. 4g although not shown.

Figure 5:
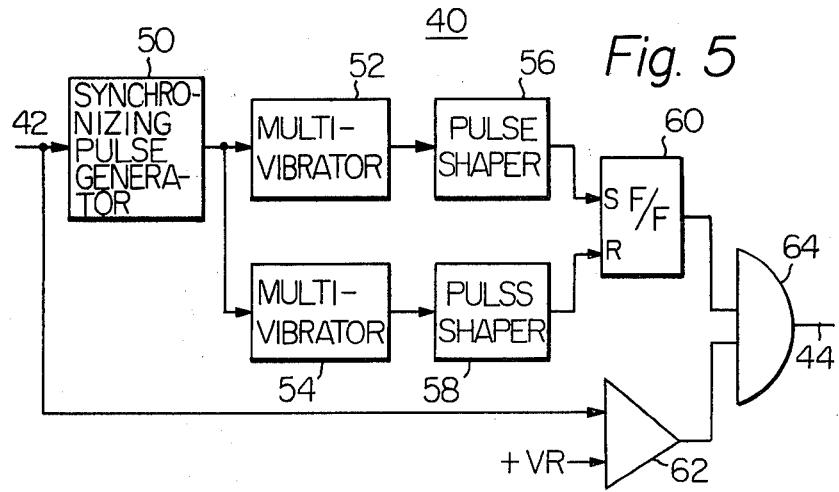
FIG. 5 is a schematic block diagram of part of the system shown in FIG. 1.
Figure 6:
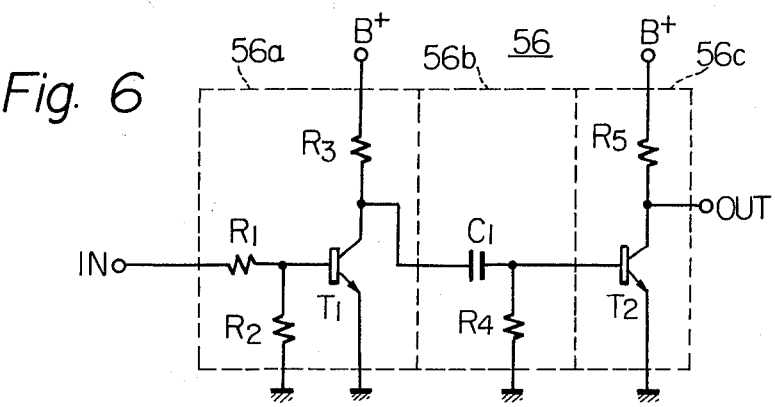
FIG. 6 is a schematic circuit diagram of part of the system shown in FIG. 5.

Any means known in the art may be used to produce the gating signal shown in FIG. 4h, and an example is shown in FIGS. 5 and 6. The skip control system 40 is shown in comprise a synchronizing pulse generator 50 arranged to produce the synchronizing pulses shown in FIG. 4a in response to pre-scanning of the synchronizer bar 14. The input of the generator 50 is connected to the output of the pre-scanning heads through the line 42. A set signal generator or multivibrator 52 and a reset signal generator or multivibrator 54 are both triggered by the downclock of the synchronizing pulse to produce the pulses shown in FIGS. 4c and 4g respectively. A pulse shaper 56 generates the pulse shown in FIG. 4f in response to the pulse of FIG. 4c, and applies the same to the set input of the bistable element, here shown as a flip-flop 60. A pulse shaper 58 identical to the pulse shaper 56 generates a pulse identical to the pulse shown in FIG. 4f in response to the downclock of the pulse shown in FIG. 4g and applies the same to the reset input of the flip-flop 60. The output of the pre-scan heads is applied through the line 42 to an input of a comparator 62, the other input of which is connected to a reference voltage source +VR. The outputs of both the flip-flop 60 and the comparator 62 are applied to inputs of an AND gate 64, the output of which is connected to the input of the position control unit 24 through the line 44.

In operation, as a main scan line is pre-scanned by the pre-scan heads, the synchronizing bar 14 is first scanned to produce the first synchronizing signal which is applied to the synchronizing pulse generator 50 to produce the first pulse shown in FIG. 4a. The downclock of the pulse of FIG. 4a is arranged to occur before the pre-scanning of the line 32, as shown in FIG. 4b. The downclock of the pulse of FIG. 4a triggers the set multivibrator 52, which produces the set pulse of FIG. 4c, the duration of which includes the time of generation of the signal corresponding to the line 32. This pulse is inverted, differentiated and shaped by the pulse shaper 56 to produce the pulse of FIG. 4f, which is applied to the set input of the flip-flop 60 to set the same to initiate generation of the gating signal shown in FIG. 4h, which appears at the output of the flip-flop 60 and is applied to the input of the AND gate 64. The trailing edge or downclock of the pulse of FIG. 4c also triggers the reset multivibrator 54 to produce the reset pulse shown in FIG. 4g, the downclock of which occurs before the signal corresponding to the line 34. This pulse is inverted, differentiated and shaped by the pulse shaper 58 and applied to the reset input of the flip-flop 60 to reset the flip-flop 60 to produce a negative output corresponding to termination of the gating signal as shown in FIG. 4h.

Simultaneously, any electrical signals resulting from pre-scanning usable information as well as the lines 32 and 34 are applied to the comparator 62, which acts as a quantizer so that any signals having a voltage above the reference voltage +VR are applied to the input of the AND gate 64. The AND gate 64 produces an output signal which is fed to the position control unit 24 indicating that the line being pre-scanned is not to be skipped if an electrical signal and the gating signal appear simultaneously at the inputs of the AND gate 64. The lines 32 and 34 will be ignored since the electrical signals resulting from pre-scanning thereof are not coincident with the gating signal.

A circuit diagram of the pulse shaper 56 is shown in FIG. 5. The pulse shaper 58 is identical and not shown. The pulse shaper 56 comprises an inverter 56a, a differentiator 56b and a pulse shaper 56c. The output of the multivibrator 52 is connected to an input terminal IN of the inverter 56a which is connected to ground through resistors $R_1$ and $R_2$. The base of an NPN transistor $T_1$ is connected to the junction of the resistors $R_1$ and $R_2$, and the emitter thereof is grounded. The collector of the transistor $T_1$ is connected to a voltage source B+ through a resistor $R_3$. The differentiator 56a comprises a capacitor $C_1$ connected at one end to the collector of the transistor $T_1$ and at the other end to ground through a resistor $R_4$. The pulse shaper 56c comprises an NPN transistor $T_2$, the base of which is connected to the junction of the capacitor $C_1$ and resistor $R_4$ and the emitter of which is grounded. The collector of the transistor $T_2$ is connected to the source B+ through a resistor $R_5$ and also to an output terminal OUT which is connected to the set input of the flip-flop 60.

In operation, the pulse shown in FIG. 4c is applied to the input terminal IN. The transistor $T_1$ is normally biased into out-off, but is caused to conduct by the positive pulse at the input terminal IN. The collector voltage drops from B+ to a lower value, thus producing the inverted pulse of FIG. 4d. This drop in collector potential of the transistor $T_1$ causes the capacitor $C_1$ to discharge through the resistor $R_4$ and collector-emitter circuit of the transistor $T_1$ so that the surge of current through the resistor $R_4$ causes the negative spike of the signal of FIG. 4e to appear at the base of the transistor $T_2$ to bias the same below cut-off in accordance with the time constant of the capacitor $C_1$ and resistor $R_4$. Discharge of the capacitor $C_1$ will result, after stabilization, in a zero potential appearing at the base of the transistor $T_2$. In response to downclock of the pulse of FIG. 4c, the collector potential of the transistor $T_1$ will again increase to B+ since the transistor $T_1$ becomes cut-off. The capacitor $C_1$ will then charge through the resistors $R_4$ and $R_3$ to produce the positive spike shown in FIG. 4e at the base of the transistor $T_2$ as charge current surges through the resistor $R_4$. The transistor $T_2$, which was biased into cut-off, will conduct during the duration of the positive spike (resulting from the downclock of the pulse of FIG. 4c) since the positive base potential will cause the transistor $T_2$ to conduct and produce the negative pulse shown in FIG. 4f which is applied to the set terminal of the flip-flop 60.

Figure 7:
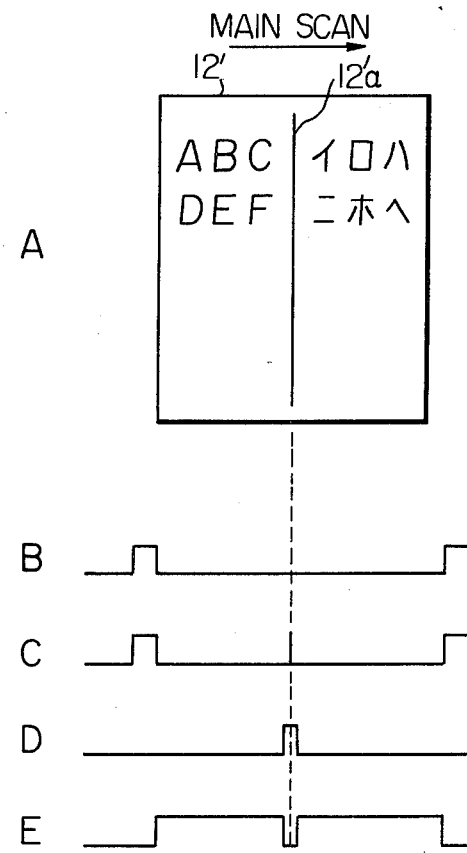
FIG. 7 is a graphic representation of a modified form of the document shown in FIG. 2 and an associated timing chart.

FIG. 7a shows a document 12' having a single vertical ruled line 12a down the middle thereof. FIGS. 7b to 7e correspond to FIGS. 3b to 3e for the document 12'.

Figure 8:
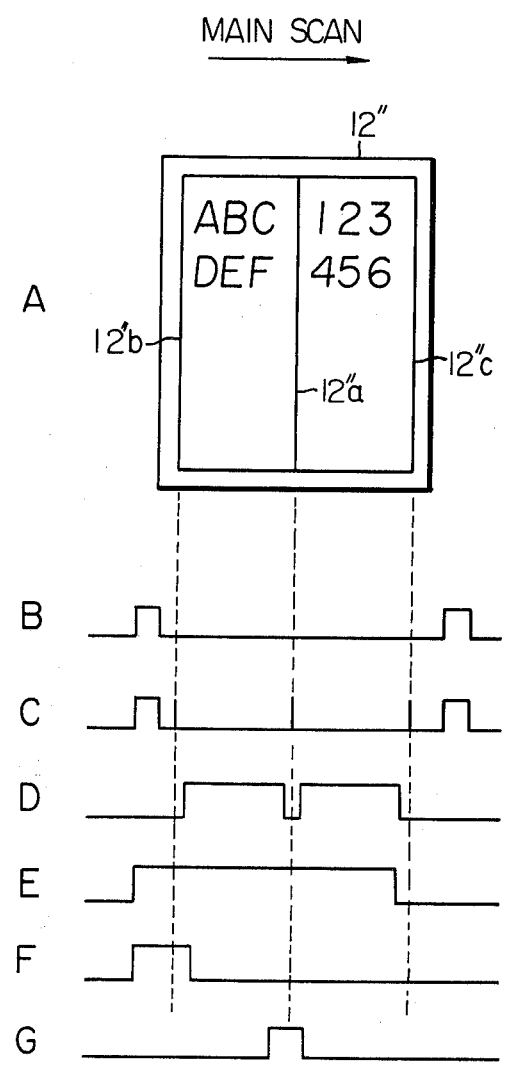
FIG. 8 is similar to FIG. 7 but illustrating another modification.

FIG. 8a illustrates a combination of FIGS. 2 and 7a in which a document 12'' has a vertical ruled line 12''a corresponding to the line 12'a of FIG. 7a and vertical ruled lines 12''b and 12''c corresponding to the lines 32 and 34 of FIG. 3, FIG. 8b is identical to FIG. 3a, FIG. 8c is similar to FIG. 3b but shows an additional signal resulting from pre-scanning of the line 12''a. FIG. 8d is similar to FIG. 3e, but generation of the gating signal is suppressed during an interval in which the line 12''a is being pre-scanned.

Figure 9:
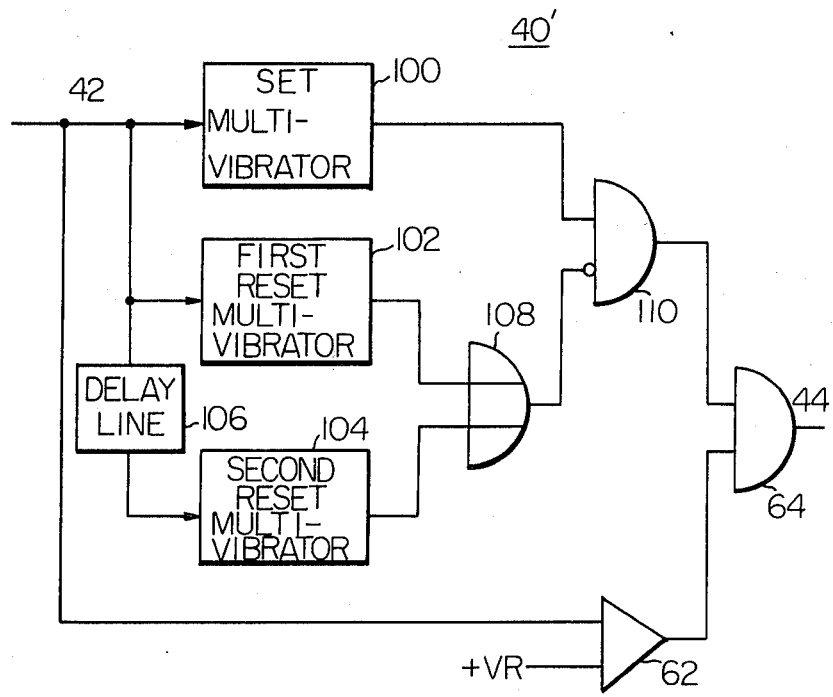
FIG. 9 is similar to FIG. 5 but illustrates a modification applicable to FIG. 7.

FIG. 9 shows a modified skip control system 40' operative to produce the gating signal shown in FIG. 8d. The line 42 is connected directly to the inputs of a set multivibrator 100 and a first reset multivibrator 102 and through a delay element or line 106 to the input of a second reset multivibrator 104. The outputs of the reset multivibrators 102 and 104 are connected to inputs of an OR gate 108, the output of which is connected to an inversion input of an AND gate 110. The ouput of the set multivibrator 100 is connected to a non-inversion input of the AND gate 110. The output of the AND gate 110 is connected to the input of the AND gate 64 shown in FIG. 5.

In operation, the leading edge or upclock of the first synchronizing pulse shown in FIG. 8b triggers the set multivibrator 100 and first reset multivibrator 102 to produce the pulses shown in FIGS. 8e and 8f respectively. The set pulse of FIG. 8e terminates before the line 12''c is pre-scanned, and the reset pulse shown in FIG. 8f terminates after the line 12''b is pre-scanned. The AND gate 110 will produce an output signal when the set pulse of FIG. 8e is present and the reset pulse of FIG. 8f is not present, thus resulting in the gating signal of FIG. 8d which begins after the line 12''b is pre-scanned and ends before the line 12''c is pre-scanned. The leading edge of the synchronizing pulse reaches the input of the second reset multivibrator 104 after a delay time $t$ to trigger the multivibrator 104, which generates the second reset pulse shown in FIG. 8g. The time $t$ is selected to elapse before the line 12''a is pre-scanned, and the second reset pulse is arranged to terminate after the line 12''a is pre-scanned. During the time that the second reset pulse and the set pulse are both applied to the AND gate 110, the same will not produce an output signal so that the central negative portion of the gating signal of FIG. 8d is produced, which is coincident with the pre-scanning of the line 12''a.

It will be appreciated that supplementary units similar to the delay line 106 and multivibrator 104 may be connected in parallel between the line 42 and the OR gate 108 to accommodate additional vertical ruled lines on the document 12''. The gate signal generator 40' of FIG. 9 may also be modified to accommodate the single ruled line shown in FIG. 7 by extending the width of the set pulse produced by the set multivibrator 100 to cover the entire width of the document 12' and omitting or suppressing the first reset multivibrator 102. It is also possible to compensate for documents 12'' in which the distance between the lines 12''b and 12''c and the respective edges of the document 12'' adjacent thereto vary by making the multivibrators 100 and 102 adjustable to vary the widths of the set and first reset pulses respectively. The widths of the set and first and second reset pulses may also be increased if desired to allow for dimensional errors in securing the document 12'' to the drum 10. Also, the delay line 106 may be made adjustable to provide for cases in which the line 12''a is not in the center of the document 12'', which would result in horizontal adjustability of the position of the second reset pulse relative to the main scan line.

What is claimed is:

1. In a method of facsimile transmission in which a document having a ruled line in a predetermined position thereon is pre-scanned in a path substantially perpendicular to the ruled line to determine if the path contains information, an electrical signal being generated when information is encountered, and scanned for transmission along the same path only if it is determined that the path contains information, the improvement of determining if the path contains information in such a manner that the presence of the ruled line is ignored, the improvement comprising the steps of:
   a. generating gating signal in synchronism with pre-scanning the path except while pre-scanning a predetermined portion of the path which intersects the ruled line;
   b. simultaneously sensing for the presence of the gating signal and the electrical signal; and
   c. determining that the path contains information only if the gating signal and the electrical signal are sensed simultaneously.

2. In a facsimile transmission device having scanning means to pre-scan a document having a ruled line in a predetermined position thereon in a path substantially perpendicular to the ruled line to determine if the path contains information and generate an electrical signal when information is encountered and scan the document for transmission along the same path only if it is determined that the path contains information, the improvement of a system to determine if the path contains information in such a manner that the presence of the ruled line is ignored, said system comprising:
   gate signal generating means operative to generate a gating signal in synchronism with the pre-scanning of the path by the scanning means except while pre-scanning a predetermined portion of the path which intersects the ruled line; and
   sensing means having inputs responsive to the gating signal and the electrical signal and an output connected to control the scanning means, the sensing means being operative to control the scanning means to scan the path for transmission only if the gating signal and the electrical signal are simultaneously sensed by the sensing means during the pre-scanning of the path indicating that the path contains information.

3. A system according to claim 2, in which the scanning means is arranged to generate a synchronizing signal at the beginning of pre-scanning the path, the gate signal generating means being arranged to generate the gating signal in response to the synchronizing signal.

4. In a facsimile transmission device having scanning means to pre-scan the surface of a right quadrilateral document having two ruled lines on the surface thereof in a path substantially perpendicular to the ruled lines to determine if the path contains information and generate an electrical signal when information is encountered and scan the document for transmission along the same path if it is determined that the path contains information, the lines being parallel to and spaced from the leading and trailing edges of the document in the path direction by a first and second distance respectively, the improvement of a system to determine if the path contains information in such a manner that the presence of the two ruled lines is ignored, said system comprising:
   gate signal generating means operative to generate a gating signal in synchronism with the pre-scanning of the path by the scanning means, the gating signal being generated only while the scanning means sweeps the portion of the path between the ruled lines;
   sensing means having inputs responsive to the gating signal and the electrical signal and an output connected to control the scanning means, the sensing means being operative to control the scanning means to scan the path for transmission only if the gating signal and the electrical signal are simultaneously sensed by the sensing means during the pre-scanning of the path indicating that the path contains information.

5. A system according to claim 4, in which the scanning means is arranged to generate a synchronizing signal at the beginning of pre-scanning the path, the gate signal generating means being arranged to generate the gating signal in response to the synchronizing signal.

6. A system according to claim 5, in which the gate signal generating means comprises:
   a bistable element having an output constituting the output of the gate signal generating means;
   a set pulse generator having an input responsive to the synchronizing signal and an output connected to the set input of the bistable element;
   a reset pulse generator having an input responsive to the synchronizing signal and an output connected to the reset input of the bistable element; whereby
   the set pulse generator is arranged to be triggered by the synchronizing signal and generate a set pulse having a trailing edge which occurs after the scanning means sweeps past the ruled line spaced from the leading edge, the trailing edge of the set pulse setting the bistable element to produce a logically positive output constituting the gating signal; and
   the reset pulse generator is arranged to be triggered by the synchronizing signal and generate a reset pulse having a trailing edge which occurs before the scanning means sweeps up to the ruled line spaced from the trailing edge, the trailing edge of the reset pulse resetting the bistable element to produce a logically negative output.

7. A system according to claim 5, in which the sensing means comprises an AND gate having inputs responsive to the gating signal and the electrical signal respectively.

8. A skip control system for a facsimile device having scanning means to pre-scan a document having a ruled line in a predetermined position thereon in a raster pattern in which the main scan lines are substantially orthogonal to the ruled line and the side scan direction is substantially parallel to the ruled line along one of the main scan lines to determine if the main scan line contains information and generate an electrical signal when information is encountered, scan the main scan line for transmission if it is determined that the main scan line contains information and skip the main scan line if it is determined that the main scan line is void of information, the skip control system being adapted to ignore the presence of the ruled line and comprising:

gate signal generating means operative to generate a gating signal in synchronism with the pre-scanning of the main scan line by the scanning means except while pre-scanning a predetermined portion of the main scan line which intersects the ruled line; and sensing means having inputs responsive to the gating signal and the electrical signal and an output connected to control the scanning means, the sensing means being operative to control the scanning means to scan the main scan line for transmission only if the gating signal and the electrical signal are simultaneously sensed by the sensing means during the pre-scanning of the main scan line indicating that the main scan line contains information.

* * * * *